March 15, 1966  J. W. ARMSTRONG  3,240,306
ELECTROSTATICALLY CONTROLLED FRICTION COUPLING
Filed July 18, 1963

INVENTOR
Jack W. Armstrong
By Wolfe, Hubbard, Voit & Osann
ATTORNEYS

United States Patent Office 3,240,306
Patented Mar. 15, 1966

1

3,240,306
ELECTROSTATICALLY CONTROLLED FRICTION COUPLING
Jack W. Armstrong, Rockton, Ill., assignor to Warner Electric Brake & Clutch Company, South Beloit, Ill., a corporation of Delaware
Filed July 18, 1963, Ser. No. 295,992
6 Claims. (Cl. 192—84)

This invention relates to friction couplings for transmitting rotary torque in which a conducting metal surface and an opposed substantially non-conducting surface of a dielectric material coact to form a capacitance and are drawn into gripping engagement by an electric field created by impressing a voltage across the two materials.

The general object is to provide a coupling of the above character which will engage more rapidly and develop substantially more and uniform torque than has been possible heretofore.

In prior friction couplings of this type, such for example those disclosed in Patents 2,850,907 and 2,859,962, the surfaces of the conductive and non-conductive materials have been maintained in constant rubbing contact while the driving member is rotating idly. I have discovered that such continual rubbing and the uncontrollable frictional heat produced thereby accounts for the failure of such couplings to find substantial commercial use. This is because the dielectric constant of the ceramic material used changes rapidly with its temperature and possesses a satisfactory high value over only a relatively narrow temperature range. It has been impossible therefore to utilize the dielectric at or even near its full capacity in developing torque of a usable magnitude. In addition, the maintenance of such rubbing contact results in the development of a friction torque which must be opposed continually to normally hold the driven parts against turning when the coupling is de-energized. The net or useful torque developed when the coupling is energized is reduced correspondingly.

Based on this discovery, an important object of the present invention is to provide an electrostatically controlled friction coupling in which the opposed conductive and dielectric materials are out of mechanical contact while the coupling is deenergized without at the same time detracting from the responsiveness or torque output of the coupling.

Another object is to provide a construction in which the coacting surfaces are flat and normally disposed in substantial mechanical contact for rapid gripping engagement in response to the impression of an energizing voltage but under such light contact that there is no substantial heating of the parts while the coupling is deenergized.

A more detailed object is to provide an electrostatically actuated coupling in which the engagement is effected by axial flexure of a resilient metal disk of low inertia constituting the driving element of the coupling.

The invention also resides in the novel construction and mounting of the conductive and dielectric elements to achieve the foregoing objects.

Other objects and advantages of the invention will become apparent from the following detailed description taken in connection with the accompanying drawings, in which FIGURE 1 is a diametrical sectional view of a friction coupling embodying the novel features of the present invention.

2

Figure 1:
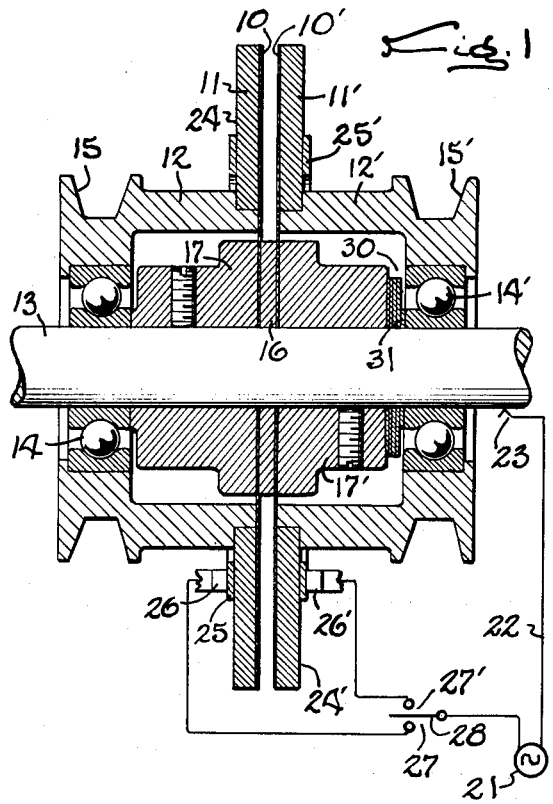
Figure 3:
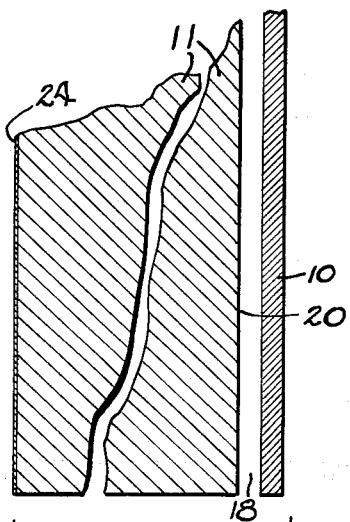
FIG. 3 is an enlargement of a portion of FIG. 1.

In the drawings, the invention is shown for purposes of illustration incorporated in an electrostatic clutch which, by causing axial gripping engagement of a driven disk 10 and an opposed adjacent driving disk 11, frictionally couples a driving member such as a sleeve 12 to a driven member such as a shaft 13 on which the sleeve is journaled through a precision anti-friction bearing 14. In service, the sleeve is usually driven continuously as by a belt engaging a pulley 15 on the sleeve. To withstand the contemplated rapid applications or reversals of the substantial torque capable of being developed, the inner peripheral margin of the disk is fitted accurately onto the shouldered inner end of the sleeve and securely bonded to the entire areas of both the axial and radial surfaces by a thin film of cement such as the epoxy resin type. Preferably, the race rings of the bearing are similarly bonded to the sleeve and the shaft.

The driven disk 10 is of substantially the same outside diameter as the disk 11 and, for a purpose to presently appear, is composed of resilient conductive metal such as steel having a thickness as small as possible, for example .0005 of an inch, without danger of wrinkling or other objectionable deformation under the torque incident to its gripping engagement with the opposed face of the driving disk while at the same time being adapted to flex axially into full face to face contact with the driving disk over the full radial width thereof. Thus, the thickness may vary with the diameter of the clutch faces, the permissible thickness increasing with the diameter of these faces. For some applications greater thickness, for example up to .008 of an inch, may be employed, thickness less than .002 being preferred. Ordinary flat spring stock and the steel commonly used for camera shutters have been found to be suitable. The inner margin of the disk 10 is clamped between and securely bonded as by a film of an electrically conductive epoxy cement to the opposed surfaces of a ring 16 and a collar 17 securely fastened to the shaft 13 as by a set screw and similar resin with the armature disk 10 precisely located either (a) as close as possible or (b) in extremely light contact with the opposed face of the disk 11 and without flexure of the disk. In the latter case, such contact is so light that the resulting rubbing is incapable of turning the disk or creating noticeable friction heat while the driving disk is turning idly. In the former case, by using available precision measuring instruments, I have found it possible to mount the disks with a very small intervening gap 18, e.g., a gap having an effective width on the order of .0005 of an inch.

Figure 2:
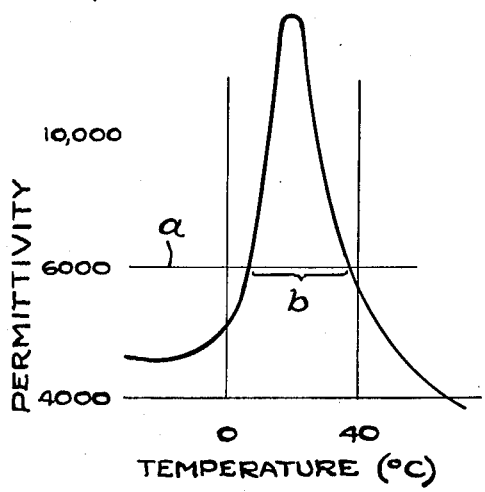
FIG. 2 is a dielectric constant vs. temperature curve of dielectric materials suitable for use in the present coupling.

In accordance with the present invention, the metal disk 10 coacts with the opposed face of the driving disk 11 to form a high capacitance. For this purpose, the latter disk is composed of a dielectric material possessing a proper combination of a dielectric constant of substantial magnitude and sufficiently high electrical resistance and dielectric strength to prevent short-circuiting through the disk when a voltage of substantial value is applied across the two disks. Suitable for this purpose are certain ceramic materials particularly those comprising a major portion of barium titanate combined with the titanates of other metals such as strontium, lead and tin. A combination of 73 percent barium titanate and 27 percent strontium titanate has been found to be particularly effective and possesses a high dielectric permittivity, for example *a* (FIG. 2), extending over a substantial temperature range *b* including the temperatures at which clutches of the present character are maintained when idle. By combining the barium titanate with other additives, for example, calcium and magnesium zirconates, the temperature range *b* can be widened considerably.

To provide the necessary high resistance to withstand the high voltages required for obtaining the desired high torque output, the disk 11 is of substantial thickness, for example, .100 of an inch. Its surface 20 is finished to perfect flatness as by precision grinding.

The metal disk 10 forms one terminal of the capacitor and is electrically connected to one terminal of a voltage source 21 through a conductor 22, a brush 23 engaging the shaft 13, the collar 17, and electrically conductive resin film. The entire outer or back surface of the driving disk 11 is covered with a film 24 of metal disposed between the disk and a thicker ring 25 secured to the film and engaged by a brush 26 joined to the other terminal of the power source through a suitable control switch 27. The conductive backing 24 may be formed and bonded to the ring 25 by the standard method of silvering commonly used in making ceramic capacitors.

In couplings where it is desirable to reverse the driving torque as applied to the driven shaft, the parts above described, indicated by corresponding primed numbers, are preferably duplicated and arranged with two driven disks 10 and 10′ disposed adjacent each other on the same hub and this assembly is disposed between two ceramic drivers 11 and 11′ rotating in opposite directions. With the driven disks at one polarity, rotation of the shaft in one direction may be initiated by selective actuation of an arm 28 to close one of the two switches 27 and 27′ and thus alternately charge the driving disk which is rotating in the direction of the desired rotation.

By making the driven member of the coupling an extremely thin disk 10, the interia of the driven parts is kept at low value enabling the complete engagement and disengagement of the coupling to be effected with extreme rapidity, for example 1000 times a second if desired. The range of commercial usefulness of the coupling is enlarged accordingly.

The rapidity of response of the friction coupling in picking up a load following application of the voltage depends on the closeness of the spacing of the opposed surfaces of the disks 10 and 11 since the force attracting the two increases at an exceedingly rapid rate as the gap between these surfaces is reduced below a few thousandths of an inch. A gap as narrow as .0001 of an inch may be obtained using modern precision measuring instruments. I have found however than an even narrower effective gap may be obtained by taking advantage of my discovery that after the surfaces have been brought into actual contact with both disks stationary but without stressing the disk 10, the surfaces will, by rotation of the driving disk become separated by an extremely thin air film or cushion thus precluding any substantial rubbing contact. The formation of this air film is believed to be due to the drawing of air in between the disk surfaces as an incident to the relative rotation between the two.

To utilize this discovery in establishing a gap minimum width, the driven disk 10 is mounted on and secured to the shaft 13 in the manner above described. Then, the bearing 14 with the collar 12 and the ceramic disk 11 mounted thereon is slid along the shaft until a slight axial deflection of the disk 10 is noted thus indicating actual mechanical contact between the ceramic and metal surfaces without any significant stressing of the metal. After measuring accurately the width of the space 30 remaining between the bearing and the outer end of the sleeve 17, a spacer 31 of equal axial length is constructed of shim stock or the like and telescoped onto the shaft after removal of the bearing and collar. After applying a coating of epoxy cement to the shaft and the interior of the inner race ring of the bearing, the latter and the collar assembly are replaced on the shaft and slid into solid abutment with the spacer. The position of the ceramic disk in the desired relation with respect to the driven disk thus becomes fixed upon final setting of the cement.

By thus maintaining the disk surfaces out of substantial rubbing contact when the driver is rotating idly, a definite operating temperature is established and the coupling may be designed to operate at an optimum value of the dielectric permittivity and thus with a correspondingly high torque output of uniform value. For the same reason, the increased attractive force together with the extremely narrow gap and the low inertia of the driven disk combine to enable the load on the disk to be picked up in an interval of minimum length and the coupling to be engaged and disengaged at an extremely high frequency.

The coupling as above described is preferably energized by alternating voltage delivered from the source 21 at a frequency correlated with the time constant of the coupling. That is to say, the frequency of the voltage is such that the coupling becomes fully energized and engaged on each direction of increase of the voltage while not becoming fully disengaged during the intervening decreases in the voltage. Thus, the coupling when subjected to a continuing voltage from the source 21 remains engaged although the extent of the engagement increases and decreases with the changing values of the voltage in each cycle.

I have found in the service operating of the coupling above described that the rapidly reversing electrostatic field of substantial magnitude induces rapid corrosion of the steel surface of the disk 10 thus detracting from the output torque developed and the speed of response of the coupling. To overcome this difficulty and adapt the coupling for heavy duty service, the active surface of the metal is covered with a thin film of a non-ferrous metal formed thereon by electrodeposition and so thin that the axial flexibility of the disk is not reduced appreciably. Suitable for this purpose are metals such as nickel or chromium deposited to a thickness of .0001 to .0005 of an inch. In spite of its thinness and the known porosity of such plating, it has been found that the steel is protected effectually without reducing the flexibility of the steel disk to an objectionable degree.

Couplings of the construction above described have been constructed with the following characteristics:

| | Inches |
|---|---|
| Thickness of ceramic disk | .120 |
| Thickness of metal disk | .003 |
| Ceramic: | |
| 73 barium titanate. | |
| 27 strontium titanate. | |
| Outside diameter of disks 10 and 11 | 3⅛ |
| Inside diameter of ceramic disk | 1⅝ |

When energized at 600 volts from an alternating source, the coupling developed a torque of 40 pound-inches.

Figure 4:
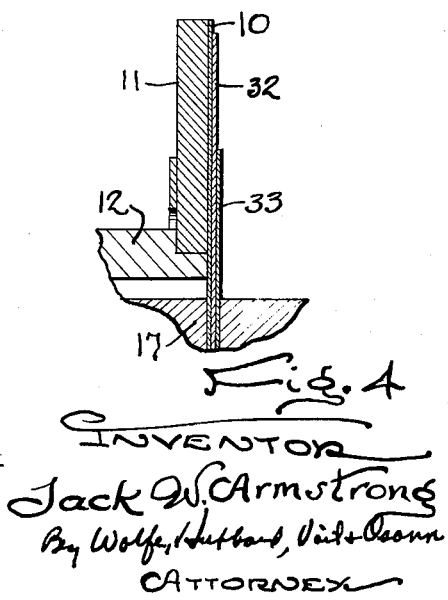
FIG. 4 is a fragmentary section similar to FIG. 1 showing a modification.

Formation of the driven disk of metal of the desired thinness and mounting the same for rapid response and for transmitting the desired torque may be facilitated by backing the disk as illustrated in FIG. 4. For this purpose, a flat disk 32 lies against the back of the disk 10 with its inner edge portion clamped between the epoxy cemented to the opposed surfaces of the disk and the collar 17. The backing thus provided is preferably extended outwardly well beyond the inner periphery of the ceramic disk. By making the disk 32 of thin metal such as shim stock or from a thin plastic sheet, the desired backing may be achieved without increasing the inertia of the driven parts appreciably. If desired, the disk 32 may be backed by one or successively smaller disks 33 clamped between the collar 17 and the disk 32.

I claim as my invention:

1. A friction coupling comprising first and second members relatively rotatable about an axis, a layer of a dielectric material having high electrical resistance fixed to one of said members and presenting a precisely flat rigid surface disposed in a plane substantially radial to the axis of relative rotation, a flat thin flexible disk of resilient metal, means for fixing the central portion of said disk to the other of said members so as to dispose the disk radially of said axis with a metal surface opposed to and substantially coextensive with said rigid surface and with an axial position providing close proximity of, but which normally precludes substantial rubbing contact and heat generation at such surfaces, and disk being of substantially uniform and extremely small thickness over its entire portion which is coextensive with said rigid surface and being freely flexible into full and intimate frictional gripping contact with such rigid surface, and means for selectively applying a voltage between said disk and dielectric material to create an electric field which flexes the disk into full face, conforming engagement with said rigid surface, thereby to engage the coupling.

2. A friction coupling as defined in claim 1 in which said flexible metal disk is less than .008 of an inch thick.

3. A friction coupling as defined in claim 1 in which the thickness of said flexible metal disk is on the order of .003 of an inch.

4. A friction coupling as defined in claim 1 in which the opposed rigid and metal surfaces are disposed in light mechanical contact when the members are stationary and the coupling is deenergized, and further including means for causing said disk to flex away from and create a small gap between such surfaces as an incident to relative rotation of said members in the absence of said voltage.

5. A friction coupling as defined in claim 1 in which the active surface of said flexible metal disk is covered by an electrodeposited film of non-ferrous metal sufficiently thin to preserve the free flexibility of the disk.

6. A friction coupling as defined in claim 1 which includes a backing disk fast on said other member and lying flat against the surface of said flexible metal disk on the side thereof opposite said rigid surface to provide a backing for limiting flexure of the metal disk away from said rigid surface.

References Cited by the Examiner

UNITED STATES PATENTS

| | | | |
|---|---|---|---|
| 2,751,056 | 6/1956 | Aumuller et al. | 192—84 |
| 2,809,732 | 10/1957 | Logan et al. | 192—21 |
| 2,850,907 | 9/1958 | Foster | 192—84 |
| 2,897,424 | 7/1959 | Waring I | 192—84 |
| 2,897,425 | 7/1959 | Waring II | 192—84 |

FOREIGN PATENTS

| | | |
|---|---|---|
| 782,526 | 3/1955 | Great Britain. |

DON A. WAITE, *Primary Examiner.*